United States Patent
Bowes

Patent Number: 5,716,254
Date of Patent: Feb. 10, 1998

[54] TURKEY CALL

[76] Inventor: William L. Bowes, 2005 Ardmore Ave., Chesapeake, Va. 23324

[21] Appl. No.: 686,654

[22] Filed: Jul. 26, 1996

[51] Int. Cl.$^6$ .............................. A63H 5/00; G10D 13/08
[52] U.S. Cl. ........................................... 446/397; 446/418
[58] Field of Search .................................. 446/202, 204, 446/207, 208, 397, 418, 417

[56] References Cited

U.S. PATENT DOCUMENTS

| | | | |
|---|---|---|---|
| 1,061,302 | 5/1913 | Lohr | 446/209 |
| 3,208,184 | 9/1965 | Wilson | 46/189 |
| 4,003,159 | 1/1977 | Piper | 46/189 |
| 4,041,639 | 8/1977 | Funk | 46/189 |
| 4,387,531 | 6/1983 | Jacob | 446/418 |
| 4,586,912 | 5/1986 | Adams | 446/397 |
| 4,648,852 | 3/1987 | Wingate | 446/397 |
| 4,662,858 | 5/1987 | Hall | 446/397 |
| 4,904,221 | 2/1990 | Taylor | 446/397 |
| 5,562,521 | 10/1996 | Butler et al. | 446/397 |

*Primary Examiner*—Robert A. Hafer
*Assistant Examiner*—Laura Fossum
*Attorney, Agent, or Firm*—Griffin, Butler, Whisenhunt & Kurtossy

[57] ABSTRACT

A turkey call comprises a brass striker plate (36) and a charred-wood striker (10). The striker plate has a convex striker surface (46) and the striker (10) includes an elongated wooden shaft (14) being charred at opposite, curved, cone-shaped, end tips (20 and 22). The striker further includes a funnel-shaped speaker (18) to which the elongated wooden shaft is removably attached. Thus, the wooden shaft of the striker can be reversed within the speaker for replacing an active end tip (20) to be rubbed against the striker plate. The funnel-shaped speaker is constructed of a soft plastic so that it can be folded and carried in a hunter's pocket. A striker plate assembly includes a wrist strap (50) for mounting the striker plate on a hunter's wrist. The speaker includes a hole for tethering the speaker to a hunter.

18 Claims, 3 Drawing Sheets

TURKEY CALL

BACKGROUND OF THE INVENTION

This invention relates broadly to the art of animal sound simulators, and more specifically to simulators for calling turkeys, or turkey calls.

Many devices have been suggested for calling wild turkeys (as well as other wild birds) by simulating the sounds of the turkeys so as to draw wild turkeys nearer. Many such "turkey calls" in the prior art have strikers and plates, with the strikers being rubbed on the plates to cause the strikers and plates to vibrate, thereby simulating sounds of turkeys. As an example, U.S. Pat. No. 4,904,221 to Taylor describes a friction turkey caller having a handle that may be cone, or horn, shaped. The handle has a hollow interior that amplifies sounds produced by moving a striker attached to the handle over the surface of a plate. The plate is of glass and has a size for fitting an average hand of a hunter. A shaft of the striker is plexiglass, or a similar plastic material. The patent notes that some metals, such as aluminum, that will not scratch the plate, may be used.

U.S. Pat. No. 3,208,184 to Wisor describes a turkey caller in which a vibratory element is a wooden peg, or post, with a projection end thereof being charred. A plate part is circular and has disk-like slate with an exterior surface.

U.S. Pat. No. 4,003,159 to Piper describes a game call in which a metal plate is preferably made of aluminum, whereas an elongated rod is made from a suitably selected hardwood.

U.S. Pat. No. 4,041,639 to Funk describes a call in which a striking plate is of aluminum and a vibratory peg is of hardwood, such as cherry.

In U.S. Pat. No. 4,586,912 to Adams, an upper member may be of slate or other rough, substantially rigid, material but, is preferably made of glass. A roughened surface may be produced on the glass by sandblasting an exposed surface. A striker can be made of hardwood for durability.

U.S. Pat. No. 4,648,852 to Wingate describes a turkey call having a slate striker plate and cedar wood side members.

A common disadvantage shared by the above calls is that they do not simulate the sounds of turkeys to a desired degree. Further, some of them are difficult for a hunter to carry and some of them do not provide sufficient amplification, or volume. Yet another difficulty with some turkey calls in the prior art is that they are not sufficiently durable in that dampness and use can unduly affect their operation. In some cases, the strikers of prior art systems must be replaced, or reworked, after only short usage.

Thus, it is an object of this invention to provide a turkey call which:

creates sounds which closely simulate various calls of wild turkeys;

is easy for hunters to transport; and is quite durable and therefore, not unduly affected by wetness, extended use, or rough treatment.

SUMMARY OF THE INVENTION

According to principles of this invention, a turkey call comprises a brass striker plate and a charred-wood striker for being rubbed on the striker plate. In a particular beneficial embodiment of the invention, the striker plate has a convex striker surface and the striker includes an elongated wooden shaft being charred at opposite curved, cone-shaped end tips. The striker further includes a funnel-shaped speaker to which the elongated wooden shaft is removably attached. Thus, the wooden shaft of the striker can be reversed within the speaker for replacing an end tip. The funnel-shaped speaker is constructed of a soft plastic so that it can be folded and carried in a hunter's pocket. A striker plate assembly includes a wrist strap for mounting the plate on a hunter's wrist. The speaker includes a hole therein for receiving a tether.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
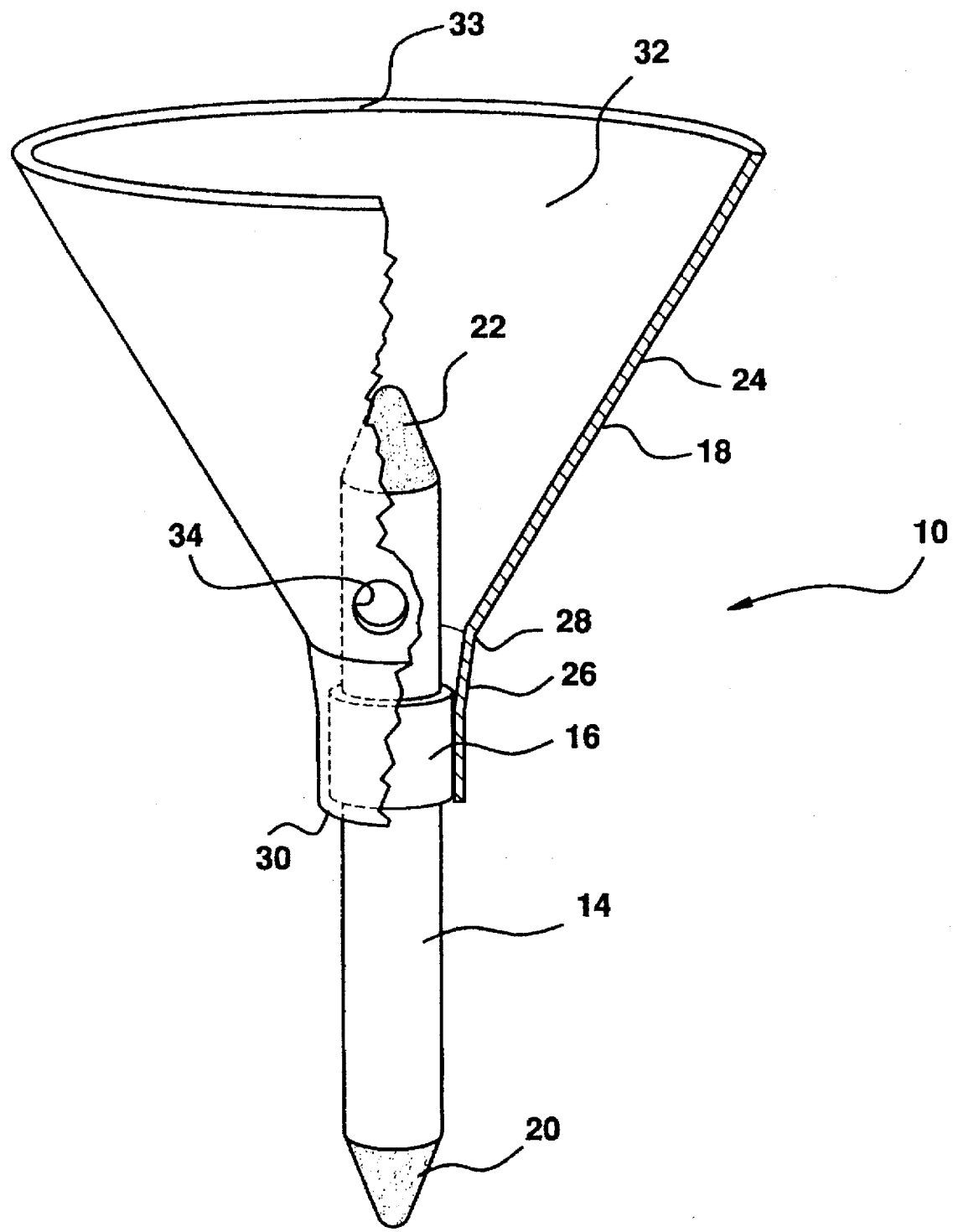
FIG. 1 is an isometric, partially cutaway, view of a striker of a preferred embodiment of the turkey call of this invention.
Figure 2:
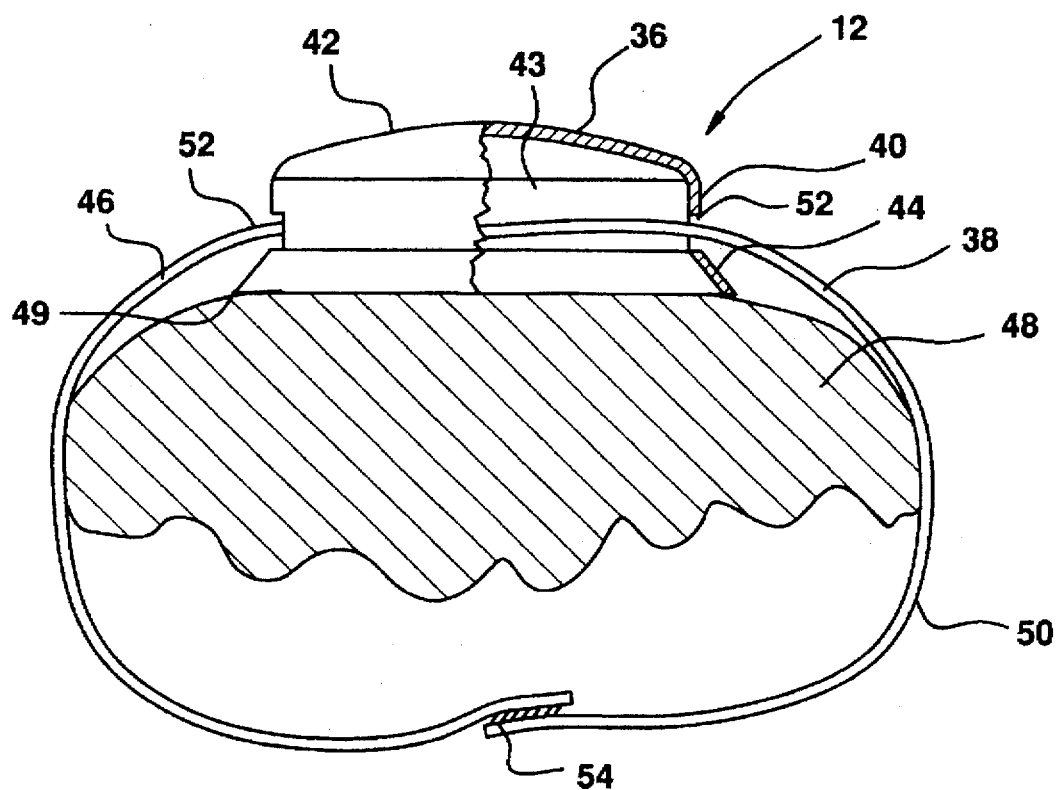
FIG. 2 is a partially-cutaway, partially-cross-sectional side view of a striker plate assembly of this invention having a wrist band holding a striker plate of the assembly on a wrist of a user.
Figure 3:
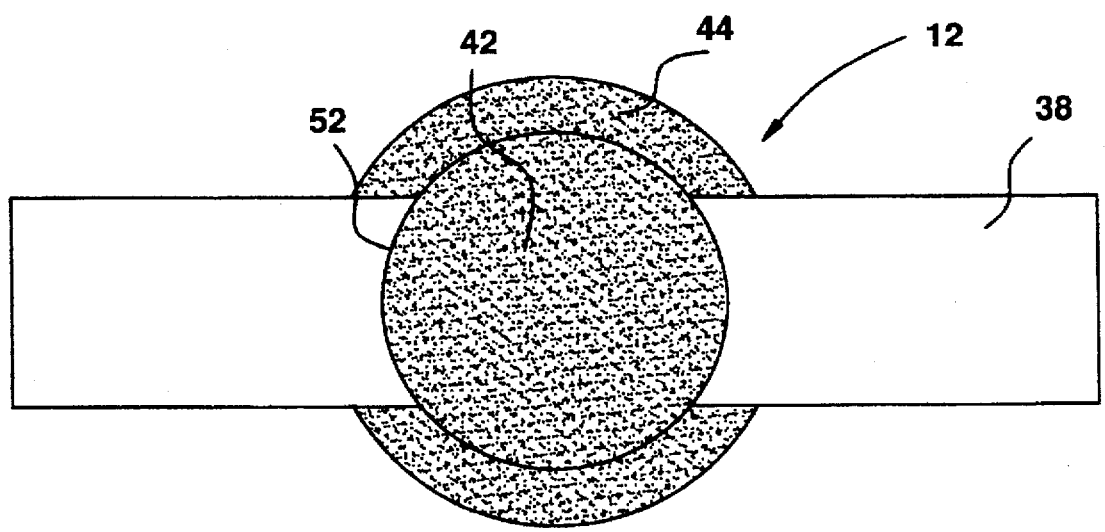
FIG. 3 is a top view of the striker plate assembly of FIG. 2, without the arm of the user.
Figure 4:
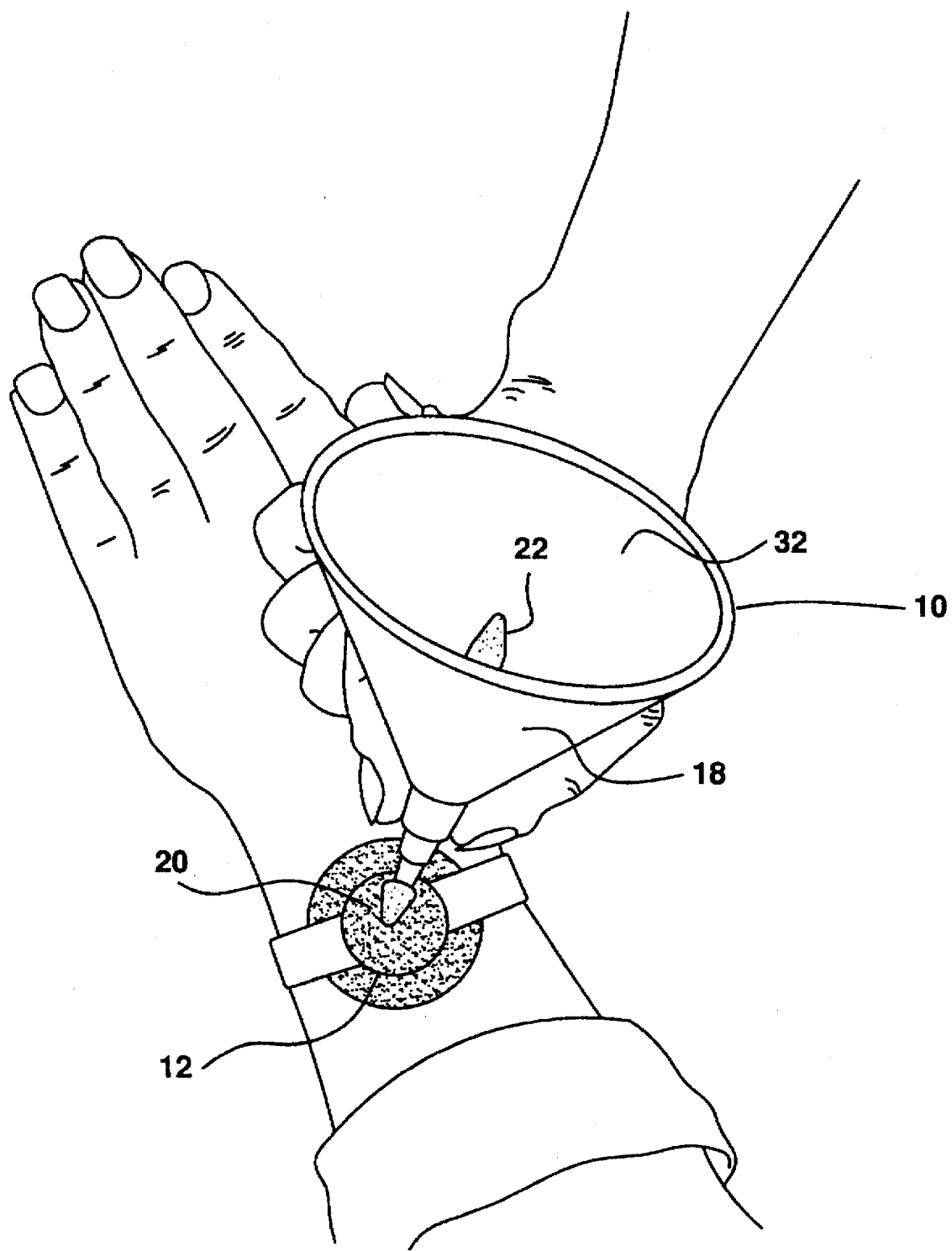
FIG. 4 is an isometric view of a turkey call of this invention being used to produce a turkey sound.

A turkey call of this invention comprises a striker 10 (shown in FIG. 1) and a striker plate assembly 12 (shown in FIGS. 2, 3 and 4).

Looking first at the striker 10, this includes a wooden shaft 14 constructed of a ⅜ inch hardwood dowel, a resinous plastic cylindrical adapter 16 and a funnel-shaped speaker 18. The wooden shaft 14 is constructed of hardwood to have a circular cross section, with first and second striker end tips 20 and 22 being at opposite ends thereof. The first and second striker end tips 20 and 22 are generally conical in shape; however, it should be noticed that their substantially-conical surfaces are formed of straight tapers ending in curved taper (or blunt) tips. The first and second striker end tips 20 and 22 are charred. In a preferred embodiment the striker 10 is 4 inches long, from first striker tip to second striker tip.

The charred first and second striker end tips 20 and 22 are covered by a rosin of liquefied southern pine which waterproofs them.

The cylindrical adapter 16 is constructed of a soft tube type resinous plastic of a size such that its ¼ inch inner diameter tightly fits the ⅜ inch outer perimeter surface of the wooden shaft 14. Thus, the wooden shaft 14 is held force-fitted in the cylindrical adapter 16. Similarly, a ⁷⁄₁₆ inch outer diameter of the cylindrical adapter 16 snugly fits an interior surface of a tapered-tubular apex wall 26 of the funnel-shaped speaker 18, as will be further described below. The cylindrical adapter 16 is ½ inch long.

The funnel-shaped speaker 18 is constructed of a soft, flexible, resinous plastic which can be held flattened so that it can be easily placed in a user's pocket; but yet it has sufficient resilience and hardness that it will expand to the shape depicted in FIG. 1 when it is removed from a pocket. The funnel-shaped speaker 18 has a cone-shaped wall 24 which forms an angle of about 40° (80° between opposite walls). Formed as one piece integrally with the cone shaped wall 24, is the tapered-tubular apex wall 26 (¾ inches long) which extends along an axis of the cone-shaped wall 24. The interior diameter of the tapered-tubular apex wall 26 is made to be larger than an outer surface of the cylindrical adapter 16 at an attached end 28 and to be smaller than the outer surface of the cylindrical adapter 16 at a free end 30. Thus, when the wooden shaft 14, with the cylindrical adapter 16 force-fitted thereon, is inserted into the tapered-tubular apex wall 26 from the attached end 28, the cylindrical adapter 16 will eventually become wedged in the tapered-tubular apex wall 26 so that the wooden shaft 14 is held therein. In this position, it is quite difficult to shove the wooden shaft 14 any further into the tapered-tubular apex wall 26 toward its free end 30, and the wooden shaft 14 is held wedge in the funnel-shaped speaker as it shown in FIG. 1. However, although the wooden shaft 14 is thusly held during use of the striker 10, it is not difficult to urge the wooden shaft 14 in an opposite direction, into a chamber 32 of the funnel-shaped speaker 18, toward the attached end 28 from the free end 30 when desired. The reason for doing this is described below. The funnel-shaped speaker 18 is about 3 inches long, from the free end 30 to an open end 33. A diameter of the open end 33 is about 3½ inches.

The cone-shaped wall 24 of the funnel-shaped speaker 18 has a hole 34 therein, near the apex wall 26, which can receive a string for tethering the striker 10 to a user. When thusly tethered, a first striker end tip 20, which projects away from the funnel-shaped speaker 18 can be directed, downwardly when in operation. However, when the striker 10 hangs free from a tether, about a hunter's neck, the wooden shaft 14 is approximately horizontal with the open end 33 flat against a user's chest, which enables a hunter to walk through a brushy area without hang-ups.

The funnel-shaped speaker 18 can be colored to match foliage with spray paint or camouflage.

Looking now at the striker plate assembly 12, this assembly includes a striker plate 36 and a wrist band 38. The striker plate 36 has a 1½ inch diameter circular shape. The striker plate 36 is formed of a dome-shaped brass wall 40 having a convex, outer striker surface 42 which, as can be seen in FIG. 2, has a rounded shape. In a preferred embodiment, the striker surface 42 is roughened periodically with sandpaper. An interior chamber defined by the striker plate 36 forms a sound chamber 43 which enhances sound broadcast by the turkey call.

The wall 40 includes a skirt 44 which is to be placed against a surface 46 of a user's body 48. A lower edge 49 of the outwardly-flared (20°) skirt 44 provides increased surface area so as to reduce discomfort to the surface 46 of the user's body 48. In a preferred embodiment, the striker plate 36 is mounted on a user's wrist by means of a wrist strap 50 which passes through ¹⁄₁₆×¾ inch slots 52 in the wall 40 of the striker plate 36, immediately above the flared skirt 44. The wrist strap 50 has loop and hook elements of VELCRO attached thereto so that it can be held in a loop about a wearer's wrist 48 with the lower edge 49 of the skirt 44 pressed against the surface 46 of the user's wrist, as depicted in FIG. 2.

In use, a user inserts the wooden shaft, or dowel, with its attached cylindrical adapter 16 into the tapered-tubular apex wall 26 of the funnel-shaped speaker 18, through the chamber 32, first-striker-end-tip 20 first. The user attaches the striker plate assembly 12 to his arm 48 as is depicted in FIGS. 2, 3 and 4. The user then holds the lower end of the wooden shaft 14, or the tapered-tubular apex wall of the funnel-shaped speaker tapered-tubular apex wall of the funnel-shaped speaker 18, in the manner of a pencil (see FIG. 4) and rubs the first striker end tip 20 on the striker plate 36. Because both the first striker end tip 20 and the striker surface 42 have sloped surfaces, the user can experiment to find optimum relative angular contacts between the first striker end tip 20 and the striker surface 42 to achieve desired turkey sounds. Normally, the turkey call is operated as follows:

1. The first striker tip 20 is placed at about 90 degrees on the striking surface and moved in a circle to make a yelp of a wild turkey.
2. The striker end tip 20 is placed at about 90 degrees and moved in straight short lines to make a cutting call of a wild turkey.
3. The striker end tip 20 is placed at about 90 degrees and moved in straight lines about one inch in either direction in a continuous motion using very light pressure to make a fighting call of a wild turkey hen.
4. All calls are made using very light pressures.
5. Other turkey sounds can be duplicated by other motions.

If the first striker end tip 20 becomes too worn, it can quickly be replaced by removing the wooden shaft 14 from the funnel-shaped speaker 18 by undwedging its cylindrical adapter 16 from the tapered-tubular apex wall 26, turning the wooden shaft 14 around, and reinserting the wooden shaft 14 into the tapered-tubular apex wall 26 with the second striker end tip 22 being outside of, and directed away from the cone shaped wall 24.

It is advantageous that the striker plate 36 is constructed of brass. It has been learned, that brass, a metal of which many bells are made, and charred hardwood produce turkey calls which are most like those of wild turkeys.

In addition to improved sound, the brass can be drawn into the desired shape once it is heated. Also, heating the brass causes it to change color to match that of a forest floor.

Similarly, the convex shape of the striker surface enhances a desired sound.

In addition, the overall shape of the striker plate 36, with its sound chamber 43 and skirt 44—giving the striker plate 36 a hat shape—has been found to provide superior sound qualities, while also providing the striker plate 36 with a shape which can be securely held and supported. In the preferred embodiment, depicted in FIG. 2, the striker plate 36 is supported on the skirt 44 in a secure fashion by the wrist band 38. However, if the wristband were not present, the lower edge of the skirt 44 of the striker plate 36 could be easily and securely held in a palm of a user's hand 42. The slots 52 for receiving the wristband 38 are above the skirt 44 so that the skirt 44 can be urged against the surface 46 of the user's body. The slots 52 do not unduly affect a sound created by the turkey call of this invention.

Use of a band, such as the wrist band 38, to hold the striker plate 36 to a user's body is extremely convenient in that it allows the user to operated the turkey call with one hand. Thus, a hunter, for example, can hold a gun with the same arm as used for supporting the striker plate assembly 12. It will be appreciated that the striker plate assembly 12 could be mounted on a user's leg, forearm, or some other body part. Normally, the striker plate assembly 12 will be in one of three different positions as follows:

1. On top of the wrist.
2. On bottom of the wrist (when in this position a gun can be held ready to shoot with the same hand).
3. In the palm of the hand, with the band encircling the palm (a gun can also be operated by this hand).

Because the cone-shaped wall 24 of the funnel-shaped speaker 18 is relatively large as compared to other turkey calls, having a length (from large opening to small opening) of 3 inches, the turkey call of this invention puts out a greater volume than do most prior art turkey calls. But at the same time, the turkey call of this invention does not occupy as much space as most prior art turkey calls in that the funnel-shaped speaker 18 can be compressed to fit in a user's pocket.

Because the wooden shaft has first and second striker end tips at opposite ends thereof, it can be reversed so as to double a life of the striker shaft.

Also the rosin which is placed on the charred first and second striker end tips 20 and 22 "water seals" these members so that they do not absorb external moisture. A sound produced by the turkey call is not unduly affected thereby. In this regard it has been found that if a rosin of liquefied southern pine is used, a sound produced by the turkey call is not unduly affected.

The wooden shaft 14 can be made of a dowel and different size dowels can be used. However, it is important that the cylindrical adapter 16 tightly fit the exterior of the wooden shaft and the interior of the tapered tubular apex wall 26. In some cases the cylindrical adapter 16 is heated to mount it on the wooden shaft 14. Usually, the cylindrical adapter 16 is constructed of a softer plastic, even than the funnel-shaped speaker 18, to ensure that it remains wedged in the tapered-tubular apex wall 26. It may be possible to eliminate the cylindrical adapter 16, however, this adapter is useful in obtaining a secure mount for the wooden shaft 14 in the funnel-shaped speaker 18. It has been learned from experience that if the striker surface 42 is not periodically roughened with sandpaper, a quality of sound produced by the turkey call of this invention may be adversely affected.

It has been found that the striker end tips 20 and 22 are worn evenly by this invention, most likely because of the matching curved surfaces of the first and second striker end tips 20 and 22 and the striker surface 44. This prolongs the life of the striker 10.

While the invention has been particularly shown and described with reference to a preferred embodiment, it will be understood by those of ordinary skill in the art that various changes in form and detail may be made therein without departing from the spirit and scope of the invention. For example, in some embodiments the speaker is not cone shaped. Also, in one embodiment, rather than being rounded, the striker plate 36 is cone shaped, having a slope of about 2°. In yet another embodiment it is flat and in another embodiment is concave, rather than convex.

The invention claimed is:

1. A turkey call comprising a striker plate and a striker for being rubbed on the striker plate, wherein the striker plate which is for being rubbed by said striker is formed of a single piece of brass.

2. A turkey call as in claim 1 wherein said striker comprises an elongated wooden shaft having a charred tip for contacting the striker plate.

3. A turkey call as in claim 1 wherein a portion of said striker plate to be rubbed by said striker is formed of a wall defining a convex shaped striker surface.

4. A turkey call as in claim 2 wherein said wooden shaft has opposite first and second charred tips.

5. A turkey call as in claim 4 wherein said striker further comprises a funnel-shaped speaker and wherein said wooden shaft is removably mounted in a tapered tubular apex area of the funnel-shaped speaker, with the first charred tip extending outwardly from the tapered tubular apex area and the second charred tip being positioned inside the funnel-shaped speaker, so that the wooden shaft can be removed from said speaker and reattached thereto with the second charred tip extending outwardly from the tapered tubular apex area and the first charred tip being positioned inside the funnel-shaped speaker.

6. A turkey call as in claim 5 wherein the funnel-shaped speaker is constructed of a resinous plastic.

7. A turkey call as in claim 6 wherein said resinous plastic of which said funnel-shaped speaker is constructed is a soft plastic so that the speaker can be flattened and placed in a pocket of a user.

8. A turkey call as in claim 2 wherein said striker further comprises a funnel-shaped speaker and wherein said wooden shaft is mounted in a tapered tubular apex area of the funnel-shaped speaker.

9. A turkey call as in claim 8 wherein the funnel-shaped speaker is constructed of a resinous plastic.

10. A turkey call as in claim 9 wherein said resinous plastic of which said funnel shaped speaker is constructed is a soft plastic so that the speaker can be flattened and placed in a pocket of a user.

11. A turkey call as in claim 10 wherein there is a hole in the funnel-shaped speaker for receiving a tether for mounting the striker.

12. A turkey call as in claim 8 wherein there is a hole in the side of the funnel-shaped speaker for receiving a tether for mounting the striker.

13. A turkey call as in claim 1 wherein a portion of said striker plate to be rubbed by said striker has a convex shaped striker surface.

14. A turkey call as in claim 13, wherein a portion of said striker plate to be rubbed by said striker is formed of a wall for defining said convex shaped striker surface.

15. A turkey call as in claim 1 wherein is further included a band attached to the striker plate at at least two opposite edge areas of said striker plate for securely holding the striker plate to a body part of a user about which the band is wrapped while said striker plate is being rubbed by said striker.

16. A turkey call as in claim 5 wherein is further included a cylindrical adaptor for tightly surrounding the wooden shaft and wedging into the tapered tubular apex area of the funnel-shaped speaker for holding the wooden shaft to the funnel-shaped speaker.

17. A turkey call comprising a striker plate and a striker for being rubbed on the striker plate:

wherein the striker comprises a speaker and an elongated striker shaft having opposite first and second shaft ends for being rubbed on said striker plate;

wherein said speaker includes a striker-shaft mounting means for removably engaging the striker shaft, at an area intermediate said first and second shaft ends of the striker shaft; and wherein when said striker shaft is engaged by said striker-shaft mounting means, one of said first and second shaft ends extends outwardly from said speaker for being rubbed on said striker plate, while the other one of said first and second shaft ends is enclosed within said speaker so that it cannot be rubbed on said striker plate;

whereby said striker shaft is configured and designed to be removed from said speaker, turned around, and replaced in said speaker, thereby interchanging the outwardly extending end and the enclosed end.

18. A turkey call as in claim 17 wherein said striker shaft includes a plastic cylindrical adapter attached to an elongated shaft intermediate said first and second shaft ends for engaging the striker-shaft mounting means of the speaker.

* * * * *